(12) United States Patent
Lucas, Jr. et al.

(10) Patent No.: US 6,658,802 B2
(45) Date of Patent: Dec. 9, 2003

(54) SEAL FOR FIXED WINDOW OF MOTOR VEHICLE WITH CURVED CONCAVE CORNERS

(75) Inventors: Joseph Lucas, Jr., Portland, OR (US); Thomas M. English, Portland, OR (US)

(73) Assignee: Northwest Rubber Extruders, Inc., Beaverton, OR (US)

( * ) Notice: Subject to any disclaimer, the term of this patent is extended or adjusted under 35 U.S.C. 154(b) by 33 days.

(21) Appl. No.: 10/112,337

(22) Filed: Mar. 29, 2002

(65) Prior Publication Data

US 2002/0104276 A1 Aug. 8, 2002

Related U.S. Application Data

(63) Continuation-in-part of application No. 09/695,759, filed on Oct. 24, 2000.

(51) Int. Cl.[7] .............................. E06B 7/23; E06B 3/62; B60J 10/02
(52) U.S. Cl. ................................ 52/204.597; 52/204.67
(58) Field of Search ...................... 52/204.591, 204.597, 52/204.62, 204.67; 296/84.1, 92, 93

(56) References Cited

U.S. PATENT DOCUMENTS

| | | | |
|---|---|---|---|
| 2,189,138 A | 2/1940 | Eichner | .......................... 20/56 |
| 2,547,799 A | 4/1951 | Wernig | ..................... 52/204.91 |
| 2,606,635 A | 8/1952 | Clingman | .................... 189/78 |
| 2,655,239 A | 10/1953 | Kenlock | ................. 52/204.597 |
| 2,770,487 A | 11/1956 | Isbell | ........................... 296/47 |
| 2,840,416 A | 6/1958 | Woodward | ................. 296/44.5 |
| 3,230,677 A | 1/1966 | Brown | ......................... 52/208 |
| 4,405,175 A | 9/1983 | Hoffmann | .................... 296/201 |
| 4,787,668 A | 11/1988 | Kawase et al. | ............... 296/93 |
| 5,343,655 A | 9/1994 | Miyakawa et al. | ........... 49/441 |
| 5,358,764 A | 10/1994 | Roberts et al. | ............... 296/93 |
| 5,424,019 A | 6/1995 | Miyakawa et al. | .... 264/177.17 |
| 5,441,685 A | 8/1995 | Miyakawa et al. | ......... 264/148 |
| 5,447,671 A | 9/1995 | Kato et al. | .................. 264/148 |
| 5,538,777 A | 7/1996 | Pauley et al. | ............... 428/122 |
| 5,779,297 A * | 7/1998 | Flauss | .......................... 296/93 |

FOREIGN PATENT DOCUMENTS

GB  562395  6/1944  ............ 52/204.591

* cited by examiner

*Primary Examiner*—Michael Safavi
(74) *Attorney, Agent, or Firm*—Chernoff Vilhauer McClung & Stenzel LLP

(57) ABSTRACT

A seal for a fixed window in a motor vehicle, including a pane-holding channel to receive and grip the opposite faces of a margin of a window pane. A sealing lip extending parallel with the pane-holding channel has a root located a small distance apart from the top edge of the pane-holding channel, and an outer margin of the lip extends to and presses sealingly against an outer surface of the window pane. In a preferred embodiment of the invention an outer margin of the main member of the seal defines a channel to receive and grip the opposite faces of a margin of the structure defining a window opening in the motor vehicle. A locking strip engaged in a locking strip groove keeps the seal in place after installation. Where two seal members meet, the respective sealing lips meet to form a curved concave corner.

10 Claims, 6 Drawing Sheets

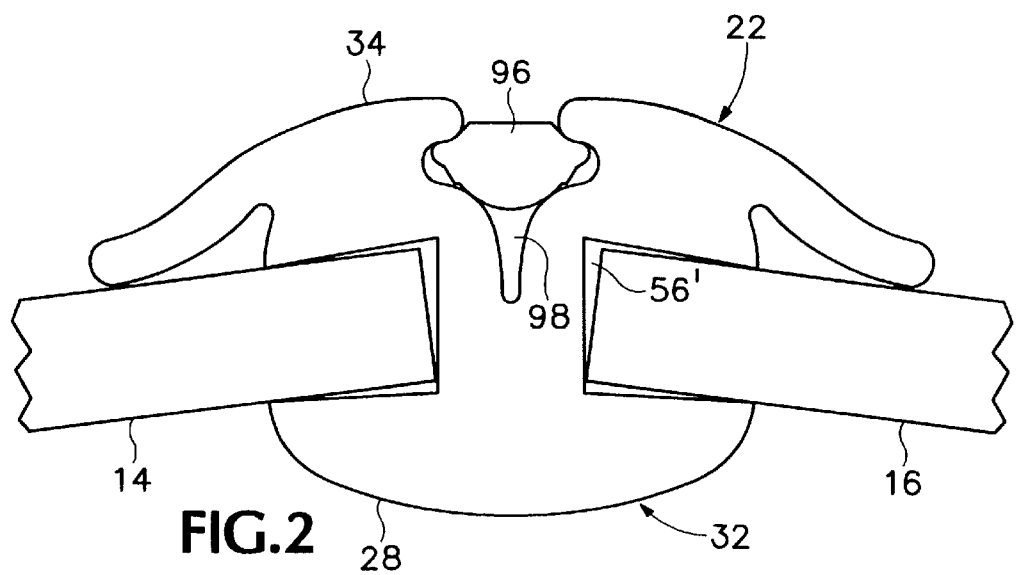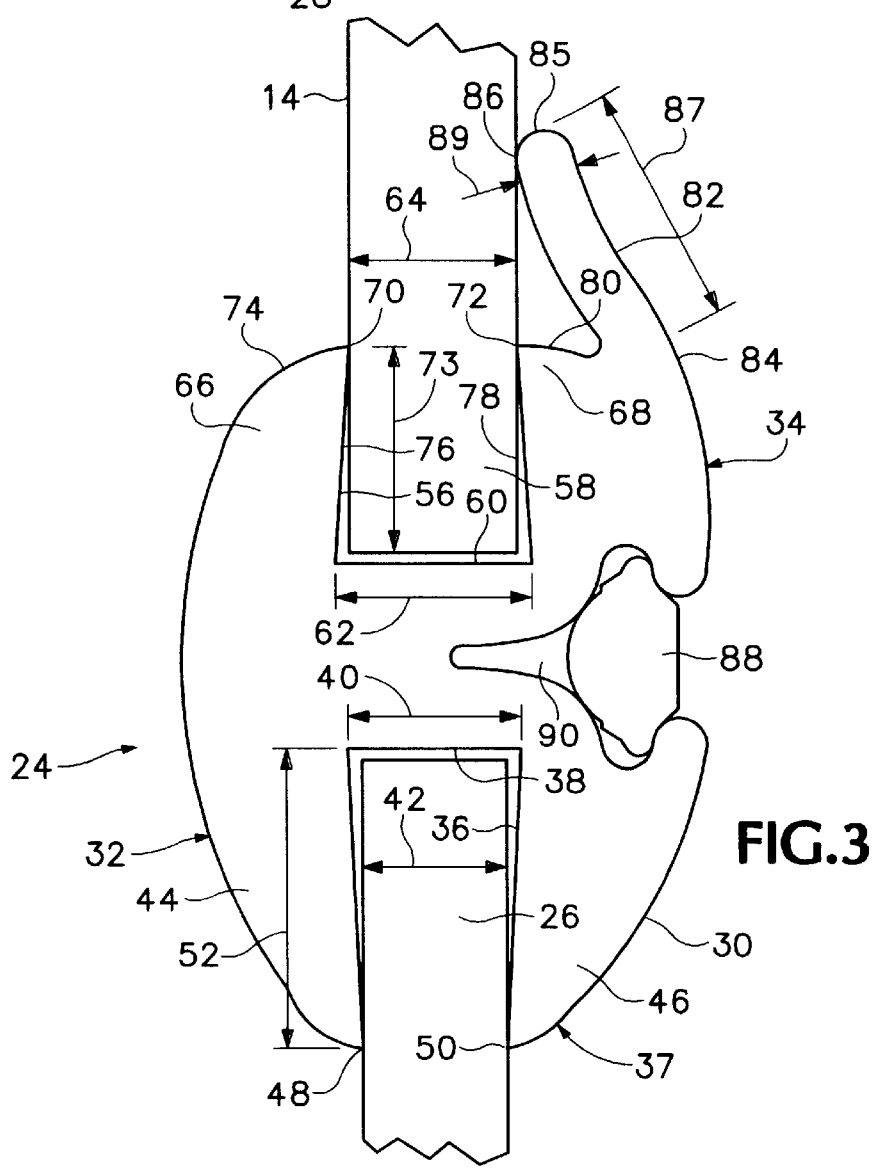

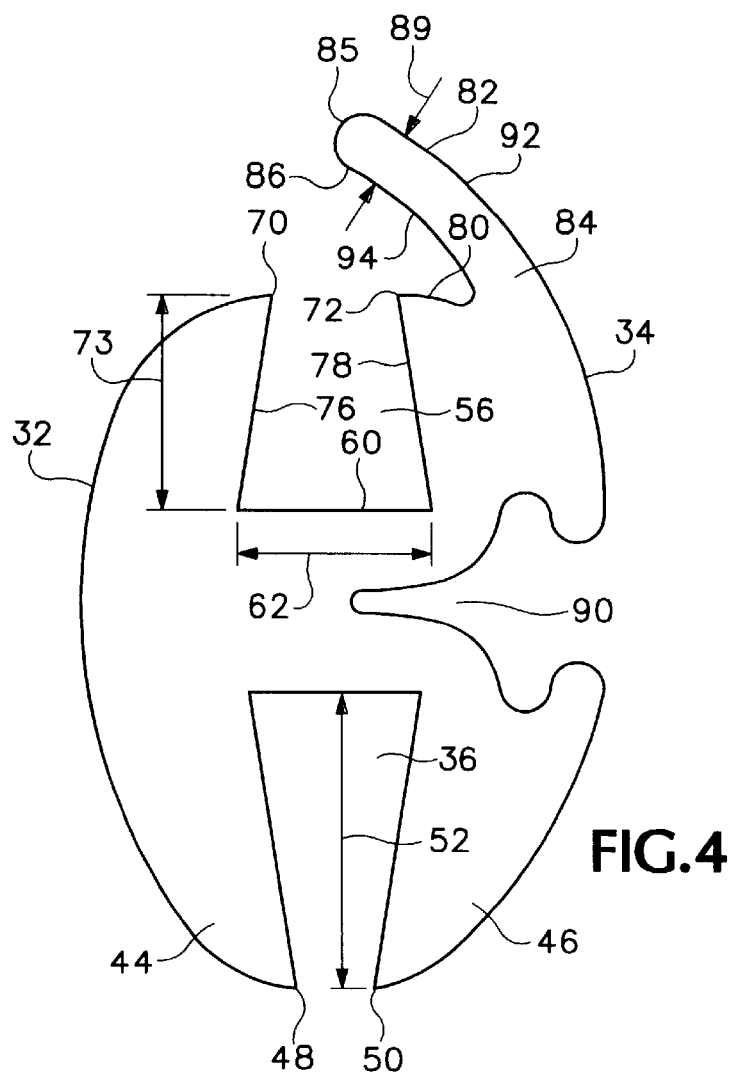
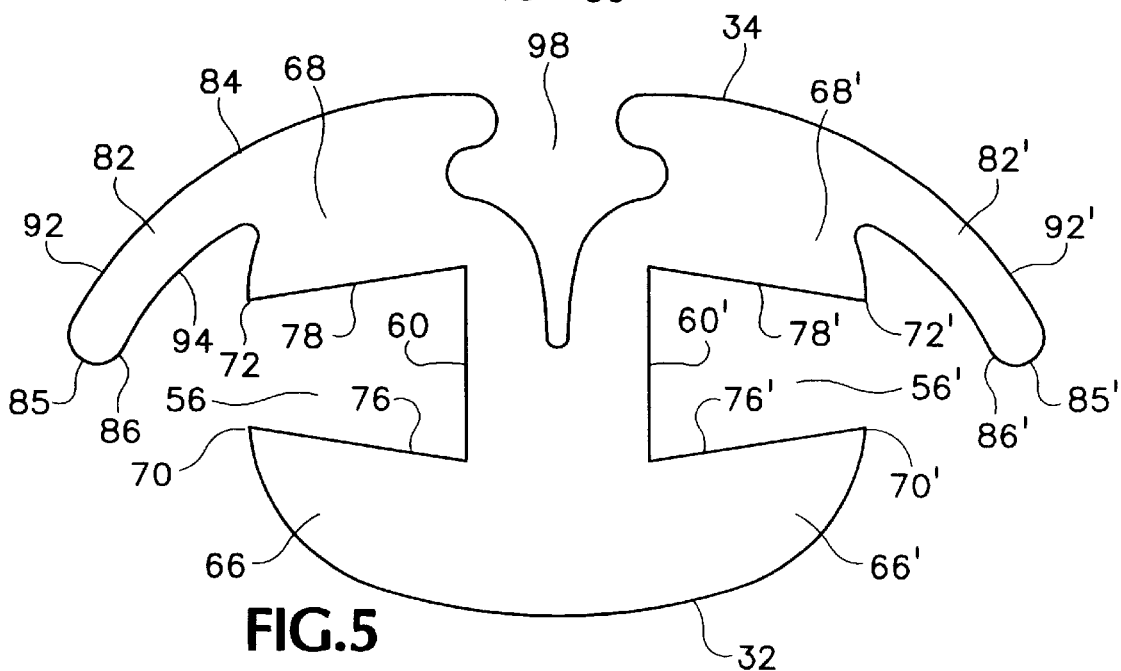

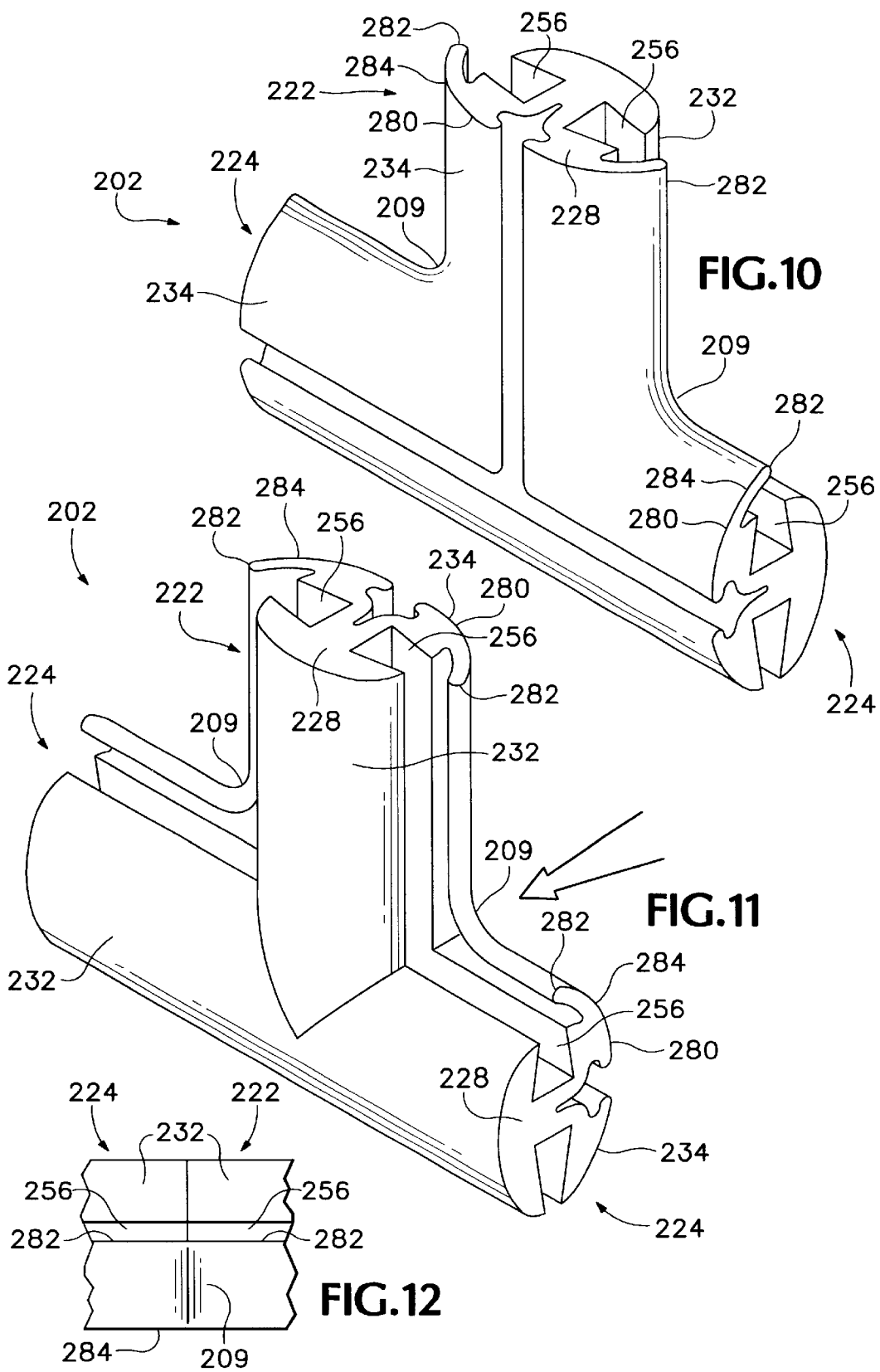

SEAL FOR FIXED WINDOW OF MOTOR VEHICLE WITH CURVED CONCAVE CORNERS

This is a continuation-in-part of U.S. patent application Ser. No. 09/695.759 filed Oct. 24, 2000.

BACKGROUND OF THE INVENTION

The present invention relates to a seal for a window in a motor vehicle, and in particular to a windshield seal for use in a large vehicle in which there may be flexing of the structure defining a window opening.

It is well known to utilize rubber seals to create a somewhat flexible support and provide a sealing interconnection between a glass pane and the relatively flexible body structure of a motor vehicle surrounding a windshield or other fixedly mounted window in a motor vehicle.

As shown in Eichner U.S. Pat. No. 2,189,138, a conventional seal for a windshield may include a rubber strip defining pair a of oppositely facing channels which receive, respectively, a margin of a body panel or the like defining a window opening and a margin of a pane of glass. A locking strip fits in a groove defined in the seal to keep the seal in place.

A somewhat similar seal structure is shown also in Isbell U.S. Pat. No. 2,770,487.

When the structure of a motor vehicle surrounding a large fixed window such as a windshield or rear window is even slightly flexible, as in the case of the window openings of the cab of a large truck, flexure may cause significant movement of surrounding body panels relative to a window pane. Relative movements of up to 3 mm may occur, resulting in relaxation of sealing pressure between a window pane and a conventional rubber seal's critical surface. When such a motor vehicle is operated on uneven surfaces, leakage may occur around a window pane if such a conventional seal is flexed and water enters into the channel surrounding the glass pane. With repeated cycles of flexure, repeated small amounts of water can enter into the channel surrounding the pane of glass and travel around the margin of the pane of glass and then be squeezed from the channel of the seal into the interior of the vehicle. Such "pumping" of water into the interior of a motor vehicle can result in significant costs, not only for repair of water-damaged interior materials, but also in terms of loss of use of the vehicle, if a commercial vehicle has to be taken out of service to accomplish repair of such a leaking condition.

In the past, repair of leaky windshield seals has often been accomplished by the use of a flexible adhesive sealant cement to create a better seal than can be obtained by only the elastic pressure of the rubber against the surfaces concerned. While this can provide a watertight seal, if a windshield sealed in this manner is damaged and must be replaced, replacement requires a significant amount of time because of the extra labor involved in dealing with the adhesive cement. Where an adhesive cement sealant is used to install a replacement windshield the motor vehicle may well be unavailable for commercial use for 48 hours to provide ample time for the adhesive material to cure properly. Since time utilized in such repair represents time when the motor vehicle is unavailable to generate revenue, not only is it desirable to provide a windshield seal which is effective in excluding water from the interior of the motor vehicle in which it is used, but it is also important to provide a seal which allows rapid and efficient replacement of the glass when that becomes necessary. It is therefore desirable to provide a window seal which is effective without the use of an adhesive sealant material in addition to the mechanical action of a glass-supporting seal assembly.

Window seals have previously been made of synthetic rubber materials such as ethylene-propylene diamene monomer ("EPDM"), or other rubber-like materials, which typically cure chemically after being manufactured and have a significant weight. It is desirable, however, for a seal to be manufactured of a material which is somewhat lighter, in order to reduce the total weight of a motor vehicle, and it is also desirable to make a seal of a material which is easily molded or extruded, yet which has the necessary strength, flexibility and resiliency.

SUMMARY OF THE INVENTION

The present invention provides an answer to some of the aforementioned shortcomings and disadvantages of the prior art window seal structures by providing a seal that is watertight despite significant window pane movement relative to the structure defining a window opening in a motor vehicle. Broadly, the present invention provides a flexible seal made of an elastomeric material, defining a channel receiving a margin of a pane of a window, and including a flexible, elastic sealing lip, located near the channel. The lip extends toward and continuously presses against the pane at a short distance away from an edge of the channel despite pane movement relative to the surrounding structure.

In one preferred embodiment of the invention a lip extends from a shoulder of an exterior wall that defines a channel in which a margin of a pane of a window is received and supported, and a narrow sealing surface along an outer margin of the sealing lip is pressed against an outer surface of the pane as a result of the elastic deformation of the lip by the pane.

In one preferred embodiment of the invention a first or outer channel is provided in an outer margin of an elastomeric main member of a seal, to receive a portion of a surrounding structure defining a window opening in a motor vehicle body, and a glass-holding channel is located opposite the outer channel in a generally coplanar arrangement, with the sealing lip extending from a shoulder of a wall defining the glass-holding channel.

In one preferred embodiment of the invention, a locking strip is engaged in a corresponding groove to keep the exterior walls of both the outer, or body panel-receiving, channel and the glass-holding channel properly located with respect to each other and with respect to the margins of a surrounding body structure defining a window opening and of a pane of the window being sealed. The locking strip thereby also helps to support the root of the sealing lip, urging the lip and, particularly, its sealing surface, into contact against an outer surface of the window pane.

In a preferred embodiment of the invention, when the main member of the seal is in a relaxed condition the lip extends curvingly toward the interior side of the main member, so that when a pane of glass is installed within the glass-holding channel the lip is elastically deformed, and a narrow sealing surface near an outer margin of the lip is elastically pressed against an outer surface of the window pane.

In a preferred embodiment of the invention the lip has a length from its root to its outer margin or tip that is at least two to four times the thickness of the lip so that the lip is resiliently flexible.

In a preferred embodiment of the invention when two portions of the seal meet, the sealing lips associated with the respective portions join together to form a curved concave corner.

In another preferred embodiment of the invention the seal comprises a T-joint with glass receiving portions on both sides of the T-stem. The intersection of the stem and cross member form a corner on each side of the stem, and the sealing lips associated with the stem and cross members join together in these corners to form a curved concave corner.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 is a sectional view at an enlarged scale, taken in the direction indicated by the line 2—2 in FIG. 1, showing portions of two transparent panes of the windshield and a portion of the seal.

FIG. 3 is a sectional view at an enlarged scale, taken along line 3—3 in FIG. 1, showing a portion of the seal shown in FIG. 1 together with a pane of the windshield glass and a portion of the surrounding structure defining the window opening of the motor vehicle.

FIG. 4 is a sectional view of a portion of the main body of the seal such as that at the location shown in FIG. 3, but free from the window pane and surrounding structure shown in FIG. 3.

FIG. 5 is a sectional view of a portion of the main body of the seal such as that shown in FIG. 2, but without the windshield glass in place.

FIG. 10 is an isometric view of a T-joint similar to that of FIG. 7 showing the sealing lips joining in a curved concave corner.

FIG. 11 is an isometric view of a T-joint of FIG. 10 as seen from the interior of the vehicle.

FIG. 12 is a side view of the T-joint of FIGS. 10 and 11 taken in the direction of the arrow in FIG. 11.

DETAILED DESCRIPTION OF THE PREFERRED EMBODIMENTS

Figure 1:
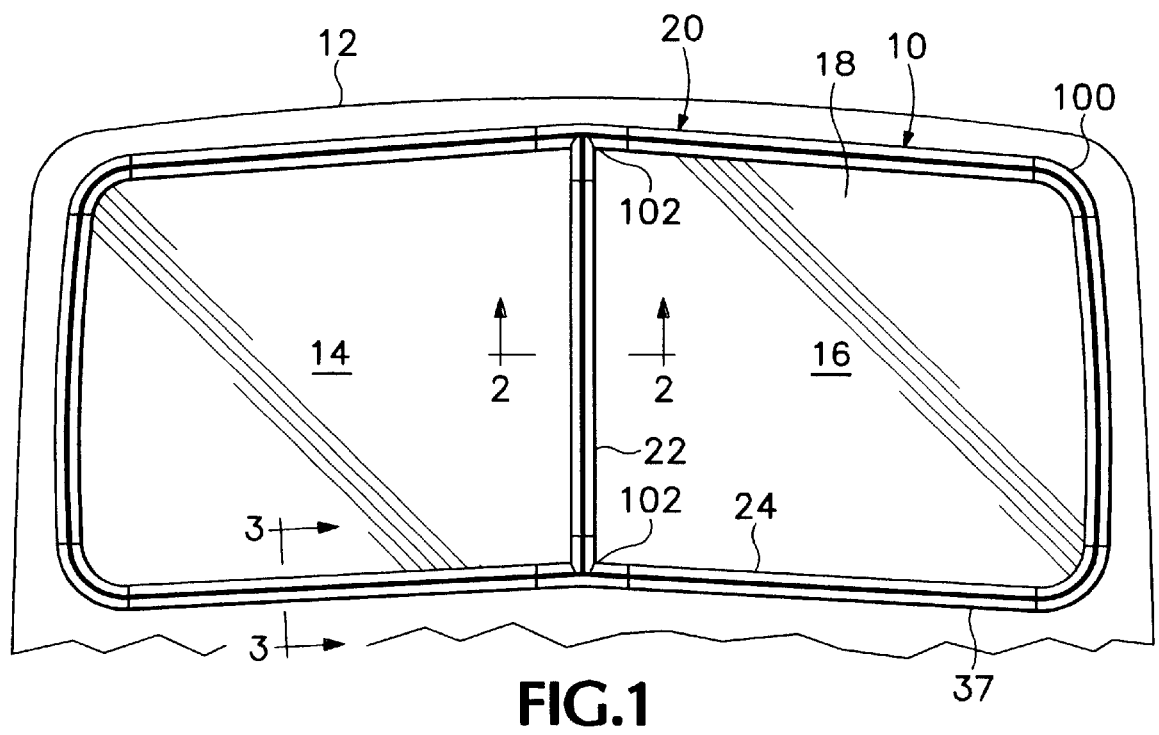
FIG. 1 is a front elevational view of a portion of a cab of a truck including a windshield equipped with a seal embodying the present invention to retain the glass panes of the windshield within the window opening defined by the cab of the truck.

Referring now to the drawings which form a part of the disclosure herein, in FIG. 1 a windshield 10 is mounted in a cab 12 of a large truck. The windshield 10 includes a pair of panes 14 and 16 of glass or other suitable transparent window pane material fixedly mounted to close a window opening 18. The panes 14 and 16 are isolated and held in place by a seal 20 which accommodates the flexing of the cab 12 resulting from operation of the truck. The seal 20 permits enough relative movement between the cab 12 and each of the panes 14 and 16 to protect the panes 14 and 16 from excessive stresses, while also providing an efficient seal to exclude water from entering into the interior of the cab 12.

The seal 20 has a configuration generally resembling a figure eight, with a center divider member 22 separating and engaging both of the panes 14 and 16, as shown in sectional view in FIG. 2. A peripheral portion 24 engages the separate portions of the margins of each of the panes 14 and 16 and also engages the surrounding portion of the body structure of the cab 12 that defines the window opening 18. In a modern semi-trailer truck tractor the shell of the cab 12 may be of laminated fiber-reinforced plastic construction including a margin 26 that is coplanar with each of the panes 14 and 16 along a respective margin of each, as shown in FIG. 3.

The center divider member 22 and the peripheral portion 24 include respective main bodies 28 and 30. The seal 20, and thus each of the main bodies 28, 30 has an interior side 32, corresponding to the interior of the motor vehicle in connection with which it is used, and an exterior side 34.

The main bodies 28 and 30 are of an elastomeric material amply tough to support the weight of the panes 14 and 16 without being cut or torn, and strong enough to maintain the positions of the panes 14 and 16. At the same time, the material should be soft enough to conform sealingly to the surfaces of the margin 26 and the panes 14 and 16, and stable enough to retain its elastic restorative force after being deformed elastically for many months and in all weather conditions. For example, a thermoplastic synthetic polymeric rubber-like material is preferred, and one such material is a thermoplastic matrix filled with crosslinked rubber particles, having a 100% modulus of elasticity in the vicinity of 350 psi and a hardness of 64–65 on the Shore A scale, available from Advanced Elastomer Systems, L.P. of Akron, Ohio under the trademark and designator Santoprene 101–64. Other thermoplastic or thermosetting elastomeric materials with Shore A hardness in the range of 55–75 would also be acceptable.

As seen in FIG. 3, the margin 26 of the cab structure defining the window opening 18 is located within a body panel channel 36 defined in an outer margin portion 37 of the main body 30. The body panel channel 36 has a bottom 38 with a width 40 that is at least as great and preferably greater than the thickness 42 of the cab structure margin 26. An interior wall 44 and an exterior wall 46 defining the channel 36 include respective planar interior wall surfaces 45, 46 that converge toward each other as they extend from the bottom 38 and approach respective edges 48 and 50, which press against the opposite interior and exterior surfaces of the margin 26 of the body structure of the motor vehicle. The edges 48, 50 are separated from the channel bottom 38 by a channel depth 52 (FIG. 4), which may be, for example, about 0.445 inch. It will be recognized that the seal 20 could also be fastened to the structure surrounding a window opening in other ways, depending on the form of such surrounding structure.

Aligned generally coplanar with the body panel channel 36 and directed oppositely away from it is a glass-receiving channel 56 in which a margin 58 of the pane 14 or 16 is received, as shown in FIG. 3. The glass-receiving channel 56 has a bottom 60 with a width 62 which is at least as great as, and preferably slightly greater than, the thickness 64 of the pane 14 or 16.

An interior wall 66 and an exterior wall 68 of the channel 56 have, respectively, an interior wall edge 70 and an exterior wall outer or upper edge 72 defining a depth 73 of 0.331 inch, for example, to the bottom 60. The interior wall 66 includes a shoulder 74 extending outwardly from the interior wall edge 70, and a planar interior surface 76 of the interior channel wall 66 extends from the interior wall edge 70 to the bottom 68 of the glass-receiving channel 56. Similarly, a planar interior surface 78 of the exterior channel wall 68 extends from the exterior wall edge 72 to the bottom 68 of the glass-receiving channel 56, and an exterior wall shoulder 80 extends along and away from the exterior wall edge 72, outside the channel 56.

A sealing lip 82 has a root 84 adjacent the exterior wall shoulder 80 and extends obliquely upward from the root 84 to an outer tip or margin 85 that includes a narrow sealing or contact surface area 86 that presses against the outer face of the pane 14, as seen in FIG. 3. The distance along the shoulder 80 between the edge 72 and the root 84 is in the range of 0.09 inch to 0.16 inch, and preferably about 0.12 inch, in the seal 20, to allow for flexing of the lip 82. It is important that the lip 82 be long and thin enough to be flexible yet be thick enough and strong enough to reliably press the contact area 86 against the pane 14. For example, in the seal 20 as shown, for panes 14 and 16 having a thickness 64 of 6.75 mm ±0.80 mm, the sealing lip 82 has a length 87 of about 0.350–0.385 inch, and a thickness 89 of about 0.095 inch, and thus the ratio of length to thickness of the sealing lip 82 is in the range of 3:1 to 5:1 and more precisely is about 4:1.

A locking strip 88, which may be of a harder, less compressible, elastomeric material than that of the main body 24, is located within a locking strip groove 90, and supports the exterior wall 46 and exterior wall 68 firmly. It also urges their edges 50 and 72, respectively, against the margin 26 of the structure defining the window opening 18 and against the pane 14 or 16 of the window.

Referring also to FIG. 4, it may be seen that in a relaxed condition the main body 30 of the peripheral portion 24 has the edges 48 and 50 of the body panel channel 36 closer together than the width 40 of that channel's bottom 38. Similarly, the interior wall edge 70 and exterior wall edge 72 are located closer together, at 0.178 inch, for example, than the width 62 (0.307 inch, for example), of the bottom 60 of the glass-receiving channel 56. Preferably, the distance between the edges 48 and 50 with the main body 30 relaxed is, for example, considerably less than the thickness 42 (for example, 0.236 inch) of the margin portion 26 of the structure defining the window opening 18. Similarly, the distance between the edges 70 and 72 of the relaxed seal 20 is thus significantly less than the thickness 64 (for example, 0.265 inch) of the pane 14 or 16 of glass to be held in place and sealed by the seal 20.

In FIG. 4 it may also be seen that in its relaxed condition, the sealing lip 82 has a convex outer surface 92 and a concave inner surface 94, and its outer margin 85 is located approximately in line with the middle of the glass-receiving channel 56. When the pane 14 or 16 is installed in the channel 56 the channel edges 70 and 72 press against opposite faces of the pane, while the sealing surface 86 also presses against the outer face of the pane 14 or 16, bending the lip 82 elastically to the form shown in FIG. 3, with the result that the sealing surface 86 is pressed against the outer face of the pane 14 by the elastic restorative force of the lip 82.

Referring again to FIG. 2 and also to FIG. 5, it will be seen that the structure of the main body 28 of the center divider member 22 consists essentially of a pair of mirror opposite portions arranged substantially back-to-back. Each of these portions is similar to the portion of the main body 30 defining the glass-receiving channel 56, and thus the main body 28 defines glass-receiving channels 56 and 56' and associated sealing lips 82 and 82'. A locking strip 96 is similar to the locking strip 88 and is similarly fitted into a locking strip groove 98 between the bases of the two exterior wall portions 68 and 68'.

Figure 6:
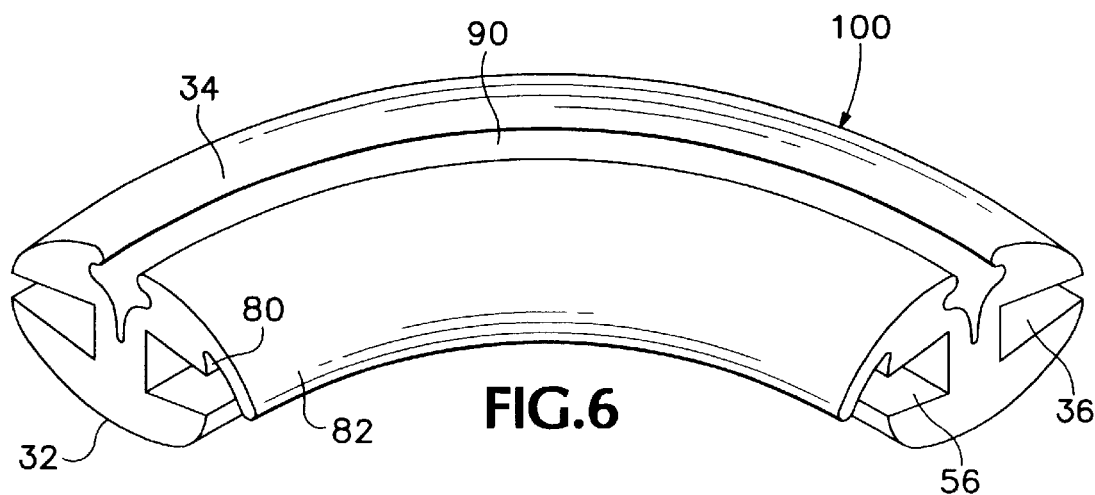
FIG. 6 is an isometric view of a curved portion of a main body of a seal such as the one shown in FIG. 1.

The straight portions of the center divider member 22 and the peripheral portion 24 of the seal 20 may be manufactured as extrusions of thermoplastic rubber. It may be preferred, however, depending upon the particular material of which the seal 20 is to be manufactured, and also depending upon the radius of curvature in arcuate portions of the seal 20, to provide curved sections 100 molded to fit the shape of a window opening 18 and panes 14 and 16. Thus, the molded portion 100, shown in FIG. 6, as seen in any radial plane including the axis of curvature of such a molded portion 100, has the same sectional shape as the straight portions of the peripheral portion 24 of the seal 20. As a result, the lip 82 in such molded sections 100 will provide the needed pressure to effect a seal on the pane 14 or 16.

Figure 7:
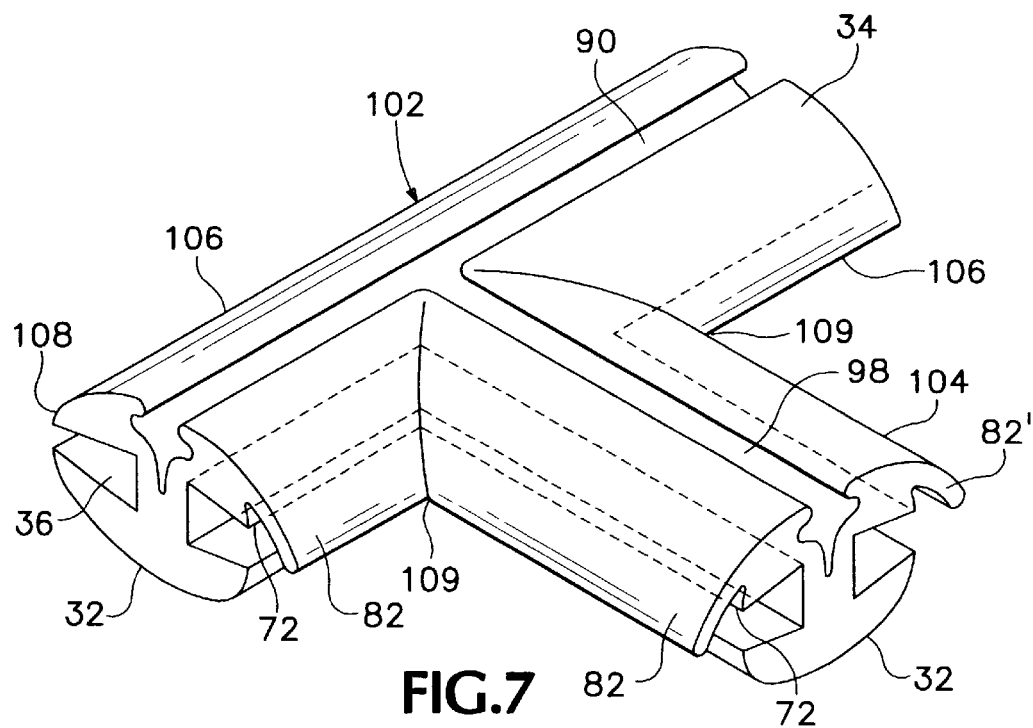
FIG. 7 is an isometric view of a "T" joint in a main body portion of a seal such as the one shown in FIG. 1.

At locations where the center divider member 22 intersects with the peripheral portion 24 it is also preferred to have a specially molded T-joint element 102 as shown in FIG. 7, in which a portion 104 has the same sectional shape as the center divider member 22, while a portion 106 has an outer margin 108 that resembles that of the peripheral portion 24 of the seal 20. The portion 104 intersects with the glass-receiving channel portion 56 to form two right-angled inside corners 109 to receive the respective corners of the panes 14 and 16 at both the top and bottom of the windshield 10.

FIGS. 10–12 show an alternative T-joint 202 similar to the T-joint 102 shown in FIG. 7. FIG. 10 shows the view from outside the vehicle, while FIG. 11 shows the interior view. In this embodiment, the center divider 222 meets the peripheral portions 224 to form a T. As in FIG. 7, the center divider 222 includes a main body 228 with an interior side 232, and an exterior side 234. The exterior side 234 of the main divider includes outwardly open glass receiving channels 256 and respective sealing lips 282 attached to the main body 228 by respective roots 284 angled obliquely off respective shoulders 280.

The peripheral portion 224 also includes a glass receiving channel 256, shoulder 280, root 284 and sealing lip 282. While the center divider 222 and its respective glass receiving channel 256 intersects the peripheral portion 224 and its respective glass-receiving channel 256 at an approximate angle of 90° in this embodiment, the respective sealing lips 282 of the peripheral portion and center divider meet in a continuous curved concave corner 209. Although the exemplary embodiment shows the center divider 222 and peripheral portion 224 intersecting at approximately 90°, this is not a requirement.

Figure 8:
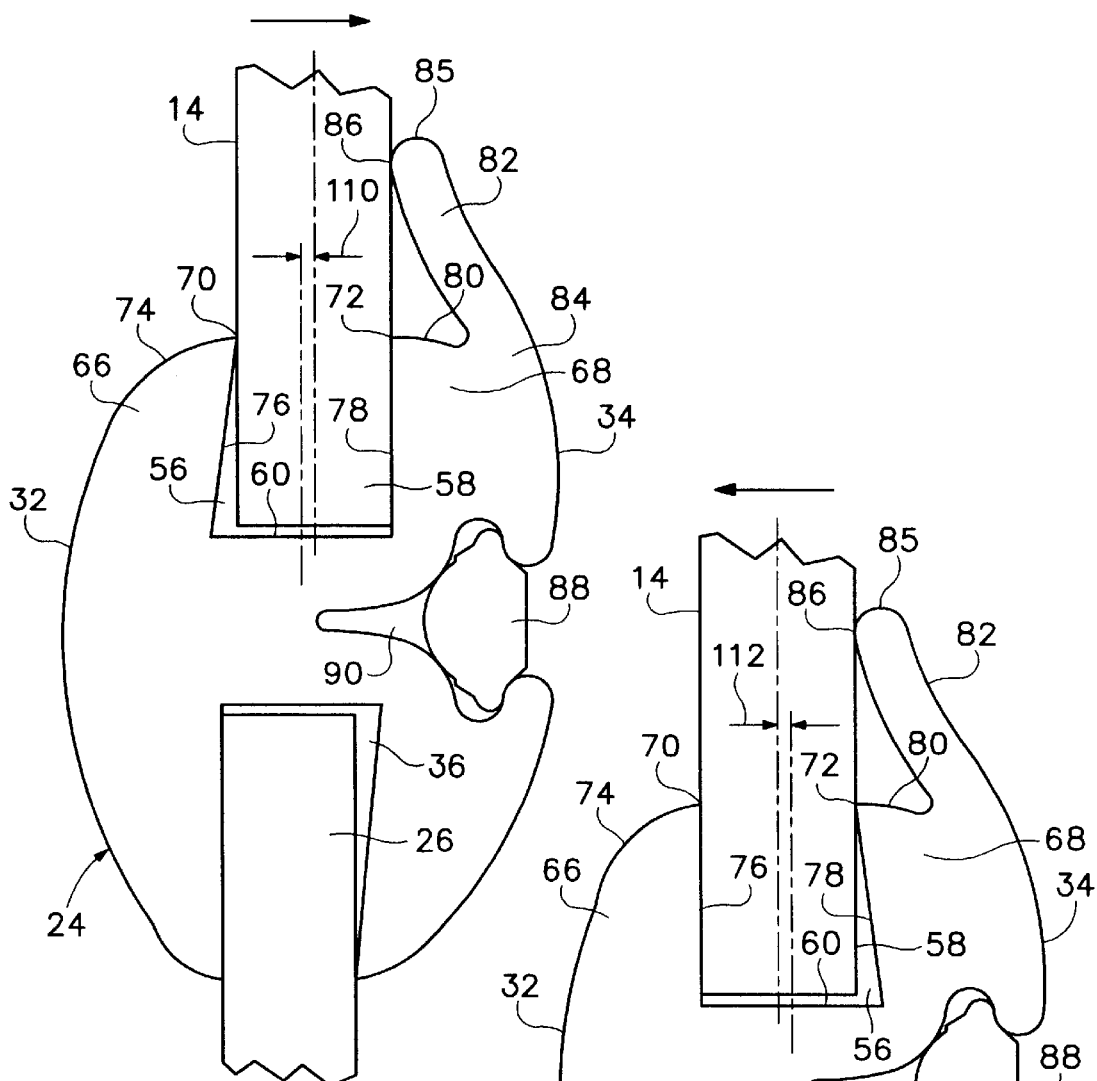
FIG. 8 is a view similar to FIG. 3, showing the manner in which the seal is flexed to accommodate displacement of a pane of the windshield in a first direction relative to the structure defining the window opening.
Figure 9:
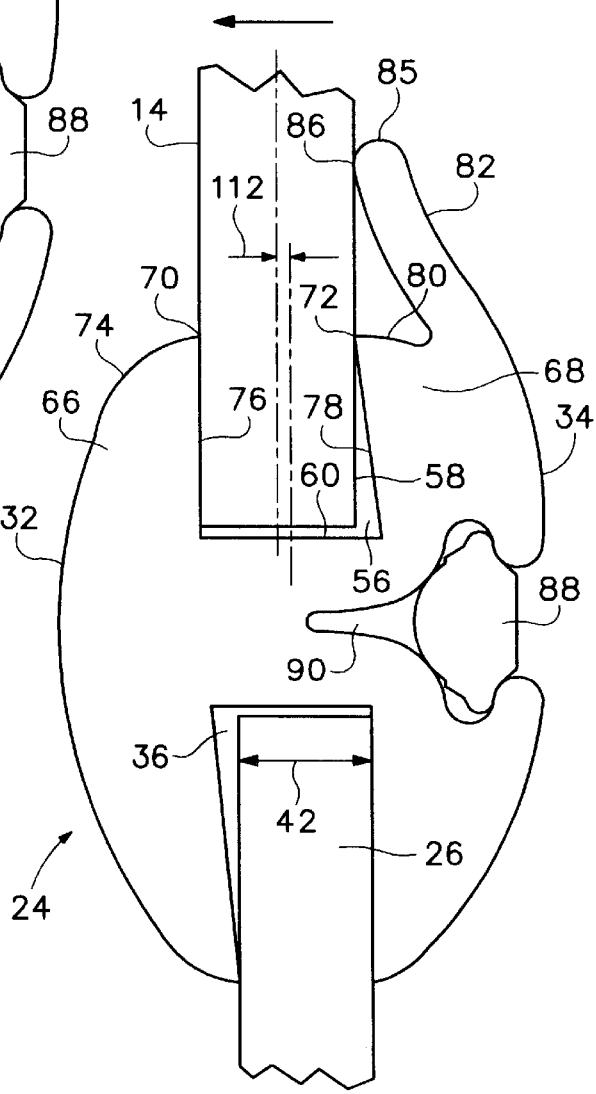
FIG. 9 is a view similar to FIG. 8, showing displacement of the windshield pane in the opposite direction from that shown in FIG. 8.

As illustrated in FIGS. 8 and 9, the seal 20 accommodates a significant amount of relative movement between the margin 26 of the structure defining the window opening 18 and the pane 14 or 16 of the windshield 10. The sealing surface 86 of the outer margin 85 of the sealing lip 82 remains in contact with the outer face of the pane 14 or 16 throughout all of a significant range of relative movement, from the position shown in FIG. 8, where the pane 14 or 16 is shown displaced relatively outward by a distance 110 with respect to the margin 26, to the position shown in FIG. 9, where the margin of the pane 14 or 16 is shown displaced relatively inward by a distance 112 relative to the margin 26 of the structure defining the window opening 18. In each position between the extremes shown in FIGS. 8 and 9 the lip 82 remains elastically deformed, with the result that there is always pressure exerted by the sealing surface 86 against the face of the pane 42.

As a result, the sealing surface 86 remains always in sealing contact against the outer face of the pane 14 or 16 and maintains a watertight seal.

As in conventional window seals, the locking strip grooves 90 and 98 divide the main bodies 28 and 30 of the seal 20, providing relatively thin and thus relatively flexible sections between the central portion of the main body and the exterior walls 46, 68. The seal 20 can thus be installed in the conventional manner by installing the peripheral portion 24 into the window opening 18, with the body panel channel 36 engaging the margin 26, and by thereafter elastically flexing and moving the exterior wall 68 away from the glass-receiving channel 56 to provide ample space for insertion of the panes 14 and 16 one after the other. The elasticity of the material of which the seal 20 is made is sufficient to retain the panes 14 and 16 until both are in place with their margins safely located within the glass-receiving channel 56 the entire way around each pane 14 and 16. Thereafter, the locking strips 88 and 96 are mounted in the locking strip grooves 90 and 98 in the conventional manner, and they thereafter urge the exterior wall 68, and along with it urge the roots 84 of the sealing ribs 82, 82', carrying respective sealing surfaces 86, 86' toward the outer surfaces of the panes 14 and 16.

As the direction of the flow of air and entrained water toward the seal 20 ordinarily does not urge water into the panel channel 36 around the margin 26 defining the window opening 18, an adequate seal is maintained around the outer margin of the seal 20 without the need for a lip such as the sealing lip 82.

While it may be desirable in some cases to use an adhesive sealant material between the seal 20 and the margin 26 defining a window opening 18, this should not ordinarily be necessary, and it should ordinarily not be necessary to utilize any adhesive sealant material between the seal 20 and the panes 14 and 16 of glass of the windshield 10, since relative movement between the margin 26 and the panes 14 and 16 will be accommodated by the available excess width in the bottom 38 of the body panel channel 36 and the excess width in the bottom 60 of the glass-receiving channel 56.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A glass-mounting seal for a fixedly mounted window of a motor vehicle, the seal comprising:
   (a) a first elongate main body of an elastomeric material, said first main body having an exterior side and an interior side and including an exterior channel wall having an exterior leading edge and a shoulder extending outwardly from said leading edge, said exterior channel wall partially defining a first glass-receiving channel in said first main body;
   (b) a first elongate resiliently flexible sealing lip integral with said first main body and extending obliquely toward said interior side of said main body from a location outwardly adjacent said shoulder and spaced outwardly apart from said leading edge, said first sealing lip having a margin including a first sealing surface facing toward said interior side of said first main body;
   (c) a second main body having a portion substantially identical to said first main body;
   (d) a second elongate resiliently flexible sealing lip integral with said second main body having a portion substantially identical to said first sealing lip;
   (e) said first main body, first sealing lip, second main body and second sealing lip being all integral with each other; and
   (f) said first main body intersecting said second main body, said first and second sealing lips meeting to form a curved concave corner.

2. The seal of claim 1 wherein said first main body defines a first axis and said second main body defines a second axis, said first sealing lip substantially parallel to said first axis and said second sealing lip substantially parallel to said second axis, said first and second axes intersecting at an angle, said first and second sealing lips meeting to form a curved concave corner.

3. A glass mounting seal for a fixedly mounted window of a motor vehicle, said seal comprising:
   (a) an elongate, main body of elastomeric material, said main body having exterior and interior sides with respect to said vehicle, said main body including a glass receiving channel having an exterior channel wall and further including a exterior leading edge with an exterior shoulder extending outwardly from said exterior leading edge;
   (b) an elongate resiliently flexible sealing lip integral with said main body and extending obliquely toward said interior side of said main body from a location outwardly adjacent said shoulder and spaced outwardly apart from said exterior leading edge, said sealing lip having a margin including a sealing surface facing toward said interior side of said main body; and
   (c) said main body including first and second elongate portions defining first and second axes that intersect at an angle, said sealing lip including first and second elongate portions defining axes generally parallel to said first and second axes, said first and second portions of said sealing lip meeting to form a curved concave corner.

4. A glass-supporting seal for a fixed window of a motor vehicle, comprising
   (a) an elongate elastomeric first main seal body having an exterior side and an interior side and defining a first channel of a size appropriate to receive a margin of structural member defining a window opening in said motor vehicle, and defining a second, glass-receiving channel of a size appropriate to receive a margin of a window pane, said main seal body including an exterior wall defining said glass-receiving channel, said exterior wall having leading edge and a shoulder extending outwardly away from said leading edge;
   (b) a resiliently flexible first sealing lip included in said first main seal body and extending along said glass-receiving channel on said exterior side of said main body, said sealing lip being biased inwardly toward said interior side of said main body and having a root located outwardly apart from said leading edge and having a margin spaced apart from said root and including a sealing surface; and (c) a second main seal body and a second sealing lip each having a portion that is integral with and substantially identical to said first main seal body and first sealing lip, said first and second main seal bodies joined together, said first and second sealing lips meeting to form a curved concave corner.

5. The seal of claim 4 wherein said first and second main seal bodies join together to form an angle.

6. The glass-supporting seal of claim 4 wherein said root of said sealing lip is located outwardly adjacent said shoulder.

7. The glass-supporting seal of claim 4 wherein said first main body includes a pair of said glass-receiving channels of a size appropriate to receive a margin of a window pane, said pair of glass-receiving channels facing oppositely away from each other, and said seal including respective resiliently flexible sealing lips associated with each of said pair of channels, each of said sealing lips being biased inwardly toward said interior side of said main body and having a respective root located outwardly apart from said outer edge of the respective one of said glass-receiving channels and a respective margin spaced apart from said root and including a respective sealing surface.

8. The seal of claim 4 wherein said root is located outwardly apart from said pane-holding channel.

9. The seal of claim 4 wherein said window includes a pair of adjacent panes held in and separated from each other by a portion of said main body including a pair of said pane-holding channels, each of said pane-holding channels engaging and supporting a respective one of said panes, a respective said sealing lip integral with said portion of said main body being similarly associated with each of said pair of pane-holding channels, each of said sealing lips having a respective root spaced outwardly apart from a respective one of said pair of pane-holding channels and having a margin including a sealing surface spaced apart from said respective root, each of said sealing lips being elastically biased toward said interior side of said main body, and said respective sealing surface of each of said sealing lips bearing upon a surface of the respective one of said window panes at a location spaced a predetermined distance apart from said respective pane-holding channel.

10. A T-shaped window seal for a fixedly mounted window of a motor vehicle, said T-shaped seal comprising an elongate stem number and an elongate cross number extending across one end of the stem, said stem and cross defining two glass receiving areas, one on either side of said stem, said stem including first and second glass seals, one on each of said stem sides, said stem seals comprising:

(a) a main body of elastomeric material having exterior and interior sides with respect to said vehicle, said main body including a glass receiving channel and further an exterior leading edge with exterior shoulder extending outwardly from said exterior leading edge;

(b) an elongate resiliently flexible sealing lip integral with said main body and extending obliquely toward said interior side of said main body from a location outwardly adjacent said shoulder and spaced outwardly apart from said exterior leading edge, said sealing lip having a margin including a sealing surface facing toward said interior side of said vertical main body; and (c) said cross member including a main body and sealing lip described in (a) and (b) above, said glass receiving channels facing said glass receiving areas on either side of said stem member, the intersection of said stem member and cross member forming a corner on each side of said stem member, said sealing lips of said stem member and said cross member joining to form a curved concave sealing surface in each of said corners.

\* \* \* \* \*